United States Patent [19]

Yamakawa

[11] Patent Number: 4,632,520
[45] Date of Patent: Dec. 30, 1986

[54] PLASTIC OBJECTIVE LENS SYSTEM ADAPTED FOR CORRECTION FOR TEMPERATURE

[75] Inventor: Hiromitsu Yamakawa, Ohmiya, Japan

[73] Assignee: Fuji Photo Optical Co., Ltd., Saitama, Japan

[21] Appl. No.: 610,435

[22] Filed: May 15, 1984

[30] Foreign Application Priority Data

May 16, 1983 [JP] Japan .................. 58-86427

[51] Int. Cl.$^4$ .......................... G02B 17/08
[52] U.S. Cl. .................. 350/446; 350/470; 350/475
[58] Field of Search ............ 350/446, 470, 475

[56] References Cited

U.S. PATENT DOCUMENTS 3,205,774  9/1965  Estes .................. 350/475
4,384,766  5/1983  Tokuhara .............. 350/475

Primary Examiner—John K. Corbin
Assistant Examiner—Rebecca D. Gass

[57] ABSTRACT

A plastic objective lens system comprises at least one convex lens constituted of a plastic material exhibiting a relatively small absolute value of the coefficient of change in refractive index with temperature, and at least one concave lens constituted of a plastic material exhibiting an absolute value of the coefficient of change in refractive index with temperature, which is larger than the absolute value of the coefficient of the plastic material constituting the convex lens. A reflecting surface concave to the object and image side may be positioned at the rear of the convex lens and concave lens. The plastic objective lens system decreases fluctuation of the focal length and the conjugate distance due to a change in temperature while aberration is minimized.

4 Claims, 16 Drawing Figures

PLASTIC OBJECTIVE LENS SYSTEM ADAPTED FOR CORRECTION FOR TEMPERATURE

BACKGROUND OF THE INVENTION

1. Field of the Invention

This invention relates to a plastic objective lens system wherein fluctuation in optical characteristics due to a temperature change is reduced by use of a plurality of plastic materials exhibiting different coefficients of refractive index change with temperature.

2. Description of the Prior Art

It is known for positive power lenses constituted of plastic materials that, as the temperature rises, the focal lengths generally increase and the image formation surfaces deviate since the refractive indices of the plastic materials become small and the radii of curvature of the surfaces of the lenses become large due to thermal expansion of the plastic materials.

In order to correct for fluctuation in optical characteristics, it has been proposed, for example in Japanese Unexamined Patent Publication Nos. 57(1982)-20507 and 57(1982)-20508, to change the surface separations of lenses according to temperature.

However, the conventional system for changing the surface separations of lenses for the purpose of the correction for movement of the image formation surface due to a change in temperature requires a complicated lens barrel configuration, a high-accuracy assembly technique, and a large space of the lens system. As a result, the advantages of the use of plastic materials with regard to the manufacture cost and manufacture processes are lost.

Further, though the conventional system can correct the positions of the image formation surfaces, it has drawbacks that the optical performance is readily deteriorated since aberration such as distortion of image surfaces is aggravated, and that the optical axes of lenses are deviated from one another when the surface separations of the lenses are corrected. Thus the conventional system involves many problems to be solved for putting it into practice.

Particularly in a system wherein the image formation magnification is finite and the positions of the object, the image formation surface and the lenses are fixed, for example, in an objective lens system for copying or projection, large fluctuation in focal lengths results in large deviation of the position of image formation. Further, even though the position of image formation is corrected by moving the lens system, the magnification is fluctuated markedly. Therefore, in order to put the system into practice, it is necessary to effect correction for optical characteristics at a high accuracy with respect to temperature.

SUMMARY OF THE INVENTION

The primary object of the present invention is to provide a plastic objective lens system constructed so that, instead of changing the surface separations of lenses for the correction for movement of image formation surface due to a change in temperature, the lens system is corrected as a whole on the basis of differences in degree of change of optical characteristics among plastic materials constituting the lenses while the optical performance required for the objective lens system for copying or projection is maintained.

Another object of the present invention is to provide a plastic objective lens system which decreases fluctuation of the focal length and the conjugate distance (i.e. the optical path length from an object to an image surface) due to a change in temperature while fluctuation (increase) of aberration is minimized.

The above objects are accomplished by a plastic objective lens system comprising at least one convex lens and at least one concave lens wherein the concave lens is constituted of a plastic material exhibiting a higher degree of change in refractive index with temperature than the degree of change in refractive index of a plastic material constituting the convex lens or exhibiting a higher degree of thermal expansion than the degree of thermal expansion of the plastic material constituting the convex lens, and the ratio of the changes with temperature as the refracting power is selected within a predetermined range. In the present invention, the plastic materials constituting the convex lens and the concave lens satisfy the condition (1).

$$1 > \frac{dn1}{dt} / \frac{dn2}{dt} > 0 \tag{1}$$

wherein $dn1/dt$ and $dn2/dt$ respectively denote the coefficients of change in refractive index with temperature of the plastic materials constituting the convex lens and the concave lens.

In the plastic objective lens system of the present invention, fluctuation of the focal length and the conjugate distance due to a change in temperature is decreased while fluctuation (increase) of aberration is minimized. Particularly, in a system wherein the image formation magnification is finite and the positions of the object, the image formation surface and the lenses are fixed, for example, in an objective lens system for copying or projection, fluctuation of the focal length and the conjugate distance results in deviation of the focal point, i.e. deterioration of the resolution. Therefore, the technical effects of the plastic objective lens system in accordance with the present invention on the correction of the focal length and the conjugate distance are very valuable in practice.

For example, the plastic objective lens system of the present invention is composed of a convex lens, a concave lens, a stop or a reflecting surface, a concave lens, and a convex lens positioned in the sequence starting from the object side. The convex lenses are constituted of an acrylic material exhibiting a coefficient of change in refractive index with temperature of $-8.5 \times 10^{-5}/°C$. and the concave lenses are constituted of Cevian MAS30 (trade name) exhibiting a coefficient of change in refractive index with temperature of $-13.3 \times 10^{-5}/°C$. Thus correction for temperature as the refracting power is achieved on the basis of the difference in the coefficient of change in refractive index with temperature between the plastic materials of the lenses.

When the degrees of change in refractive indices of the convex lens and the concave lens with temperature are equal or close to each other, a plastic material exhibiting a coefficient of linear expansion relatively larger than that of the plastic material constituting the convex lens should be employed for the concave lens.

When the characteristics of the objective lens system are below the lower limit of the condition (1), the effect on correction for temperature required for the objective lens system disappear, and deterioration of the optical characteristics such as shift of the focal point caused by fluctuation in temperature increases. When the characteristics of the objective lens system are above the upper limit of the condition (1), the effect on correction for temperature required for the objective lens system disappear, and it becomes very difficult to select the ratio of changes with temperature as the refracting power.

DESCRIPTION OF THE PREFERRED EMBODIMENTS

The present invention will hereinbelow be described in further detail with reference to the accompanying drawings.

Figure 1:
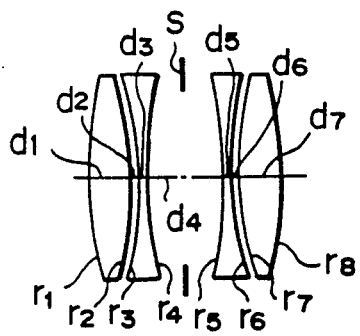
FIG. 1 is a longitudinal illustration of an embodiment of the plastic objective lens system in accordance with the present invention.
Figure 2A:
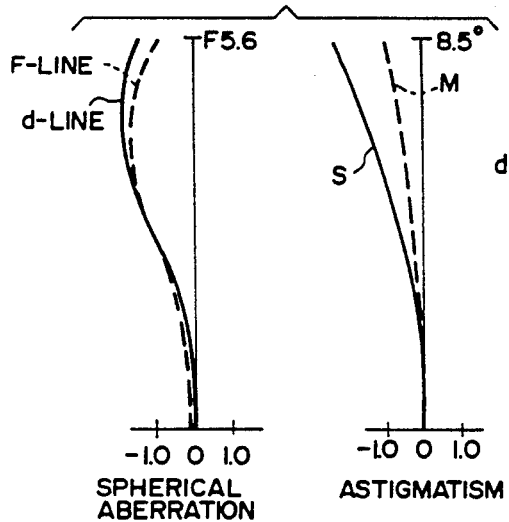
FIG. 2A depicts graphs representing the spherical aberration and astigmatism of the plastic objective lens system shown in FIG. 1 at 20° C.
Figure 2B:
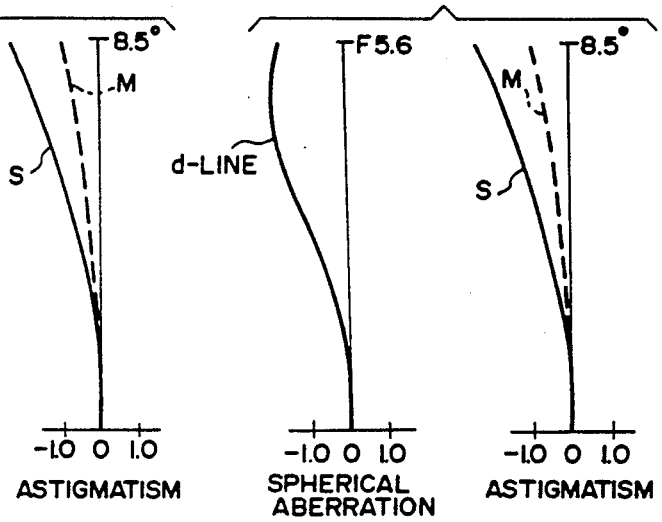
FIG. 2B depicts graphs representing the spherical aberration and astigmatism of the plastic objective lens system shown in FIG. 1 at 50° C.
Figure 2C:
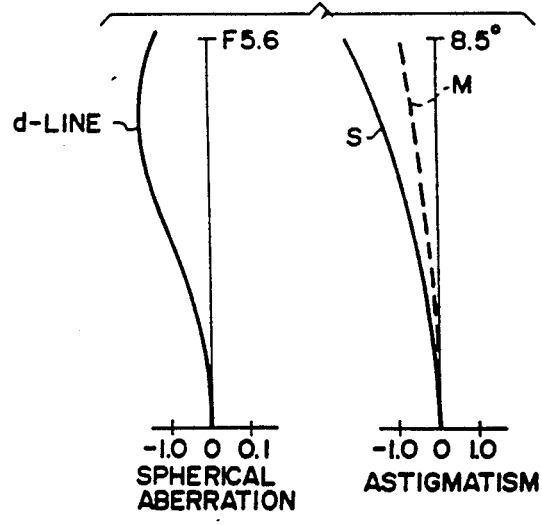
FIG. 2C depicts graphs representing the spherical aberration and astigmatism of the plastic objective lens system as shown in FIG. 1 at 50° C. wherein the coefficients of change in refractive index with temperature (dn/dt) of all the plastic materials constituting the lenses are assumed to be $-8.5 \times 10^{-5}/°C.$.

FIG. 1 shows the Embodiment I of the plastic objective lens system in accordance with the present invention, which is used for copying, projection, or the like. When the image formation magnification is 1:1, the objective lens system of the Embodiment I exhibits the spherical aberration and astigmatism at 20° C. as shown in FIG. 2A. At 50° C., the objective lens system exhibits the spherical aberration and astigmatism as shown in FIG. 2B. When the coefficients of change in refractive index with temperature (dn/dt) of all the plastic materials constituting the lenses are equally $-8.5 \times 10^{-5}/°$ C., the objective lens system exhibits the spherical aberration and astigmatism at 50° C. as shown in FIG. 2C.

The values shown in the Embodiment I are for the case where the focal length is f=100, the F-number is F=5.6 and the angle of view is $\omega = \pm 8.5°$. The character S designates the stop.

EMBODIMENT I

The Embodiment I of the plastic objective lens system in accordance with the present invention is constructed in conformity with the following table. The radii of curvature of the surfaces of lenses, the axial air separations or thicknesses of lenses, the refractive indices, the Abbe's dispersion numbers, the coefficients of change in refractive index with temperature ($\times 10^{-5}/°C.$), and the coefficients of linear expansion ($\times 10^{-5}$cm/cm/°C.) are respectively designated at r, d, n, $\nu$, dn/dt, and $\alpha$, which are numbered, respectively, in the left end column of the table in conformity with FIG. 1.

| | r | d | n | $\nu$ | dn/dt | $\alpha$ | Material |
|---|---|---|---|---|---|---|---|
| 1 | 31.772 | | | | | | |
| | | 4.001 | 1.49 | 57.2 | −8.5 | 6.5 | Acryl |
| 2 | −45.193 | | | | | | |
| | | 0.766 | | | | | |
| 3 | −35.673 | | | | | | |
| | | 1.302 | 1.537 | 45.0 | −13.3 | 6.5 | Cevian MAS 30 (trade name) |
| 4 | 80.630 | | | | | | |
| | | 7.032 | | | | | |
| 5 | −80.630 | | | | | | |
| | | 1.302 | 1.537 | 45.0 | −13.3 | 6.5 | Cevian MAS 30 (trade name) |
| 6 | 35.673 | | | | | | |
| | | 0.766 | | | | | |
| 7 | 45.193 | | | | | | |
| | | 4.001 | 1.49 | 57.2 | −8.5 | 6.5 | Acryl |
| 8 | −31.772 | | | | | | |
| | f = 100 | | F 5.6 | | | $\omega = \pm 8.5°$ | |

Figure 3:
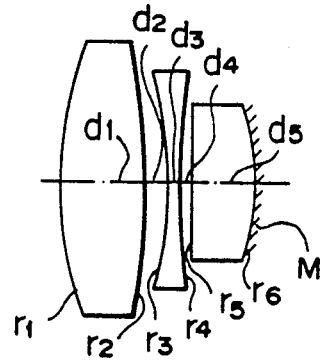
FIG. 3 is a longitudinal illustration of another embodiment of the plastic objective lens system in accordance with the present invention.
Figure 4A:
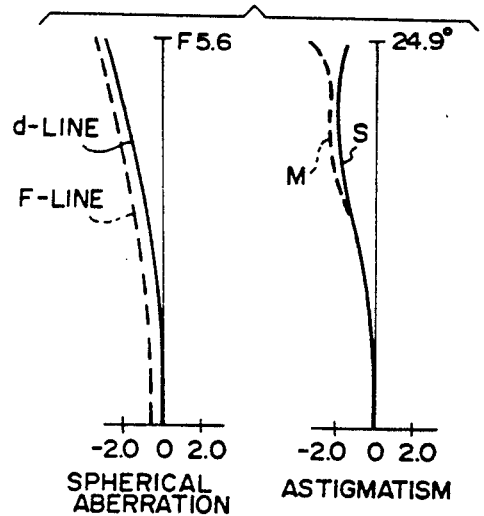
FIG. 4A depicts graphs representing the spherical aberration and astigmatism of the plastic objective lens system shown in FIG. 3 at 20° C.
Figure 4B:
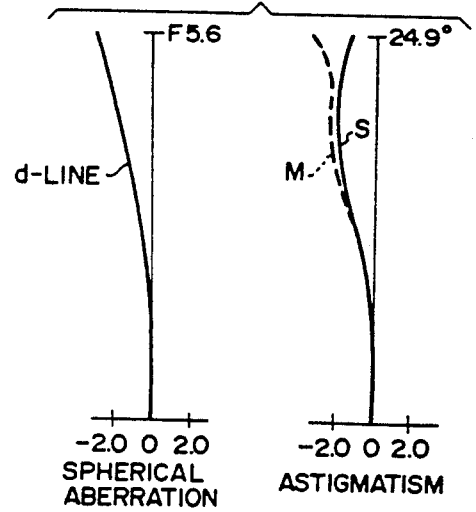
FIG. 4B depicts graphs representing the spherical aberration and astigmatism of the plastic objective lens system shown in FIG. 3 at 50° C.

FIG. 3 shows the Embodiment II of the plastic objective lens system in accordance with the present invention, which is of the in-mirror type used for copying, projection or the like. The objective lens system comprises a reflecting surface M concave to the object and image side, and a group of lenses positioned on the front side of the reflecting surface M, i.e. on the object and image side of the reflecting surface M. When the image formation magnification is 1:1, the objective lens system of the Embodiment II exhibits the spherical aberration and astigmatism at 20° C. as shown in FIG. 4A. At 50° C., the objective lens system exhibits the spherical aberration and astigmatism as shown in FIG. 4B. When the coefficients of change in refractive index with temperature (dn/dt) of all the plastic materials constituting the lenses are equally $-8.5 \times 10^{-5}/°C.$, the objective lens system exhibits the spherical aberration and astigmatism at 50° C. as shown in FIG. 4C.

Figure 4C:
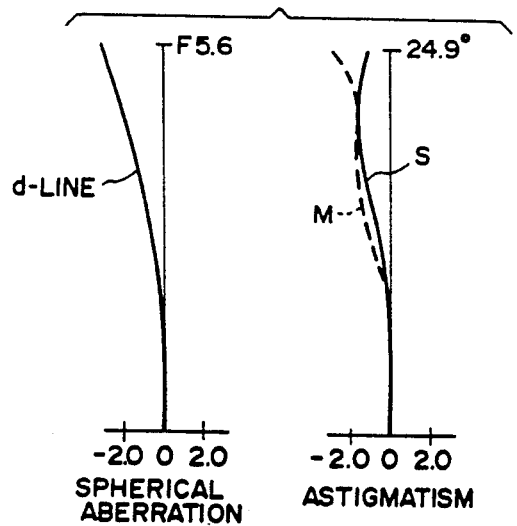
FIG. 4C depicts graphs representing the spherical aberration and astigmatism of the plastic objective lens system as shown in FIG. 3 at 50° C. wherein the coefficients of change in refractive index with temperature (dn/dt) of all the plastic materials constituting the lenses are assumed to be $-8.5 \times 10^{-5}/°C.$.
Figure 5:
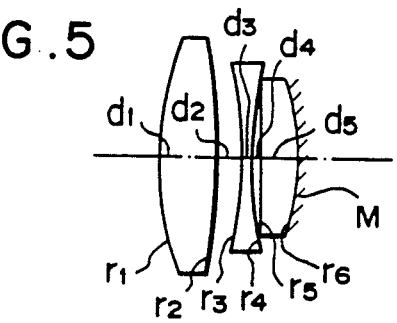
FIG. 5 is a longitudinal illustration of a further embodiment of the plastic objective lens system in accordance with the present invention.
Figure 6A:
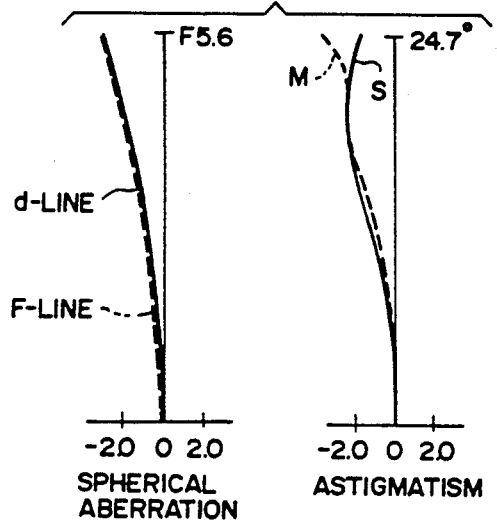
FIG. 6A depicts graphs representing the spherical aberration and astigmatism of the plastic objective lens system shown in FIG. 5 at 20° C.
Figure 6B:
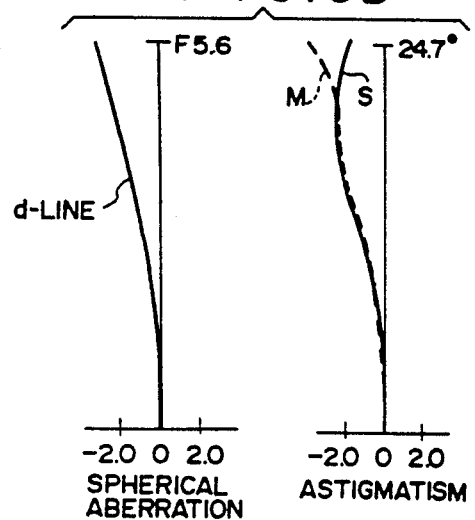
FIG. 6B depicts graphs representing the spherical aberration and astigmatism of the plastic objective lens system shown in FIG. 5 at 50° C.
Figure 6C:
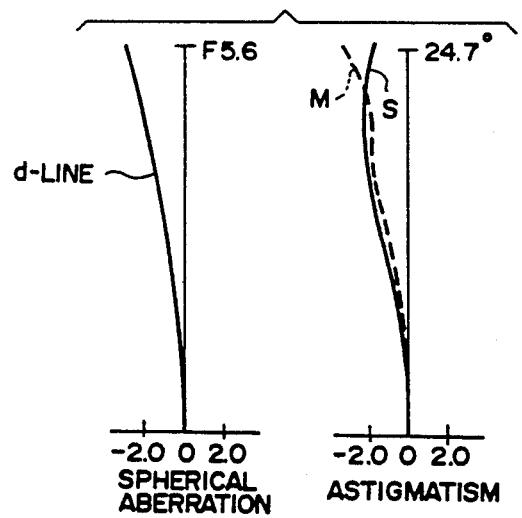
FIG. 6C depicts graphs representing the spherical aberration and astigmatism of the plastic objective lens system as shown in FIG. 5 at 50° C. wherein the coefficients of change in refractive index with temperature (dn/dt) of all the plastic materials constituting the lenses are assumed to be $-8.5 \times 10^{-5}/°C.$.
Figure 7:
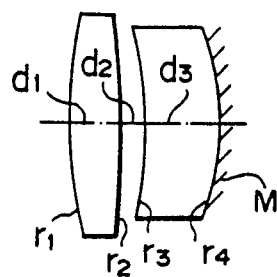
FIG. 7 is a longitudinal illustration of a still a further embodiment of the plastic objective lens system in accordance with the present invention.
Figure 8A:
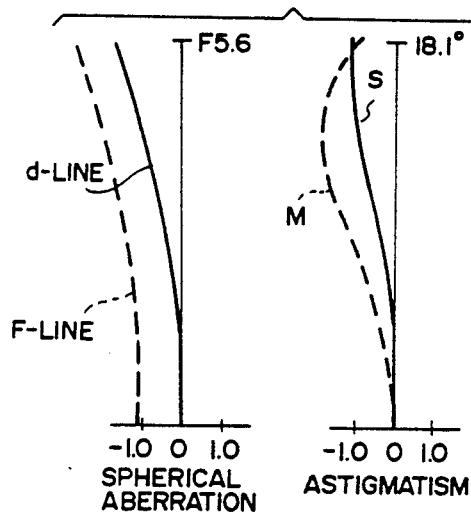
FIG. 8A depicts graphs representing the spherical aberration and astigmatism of the plastic objective lens system shown in FIG. 7 at 20° C.
Figure 8B:
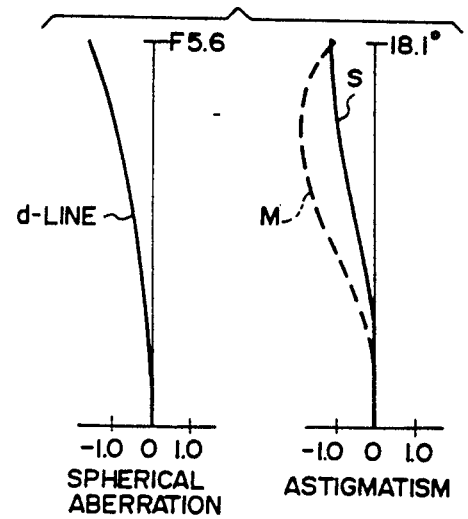
FIG. 8B depicts graphs representing the spherical aberration and astigmatism of the plastic objective lens system shown in FIG. 7 at 50° C.
Figure 8C:
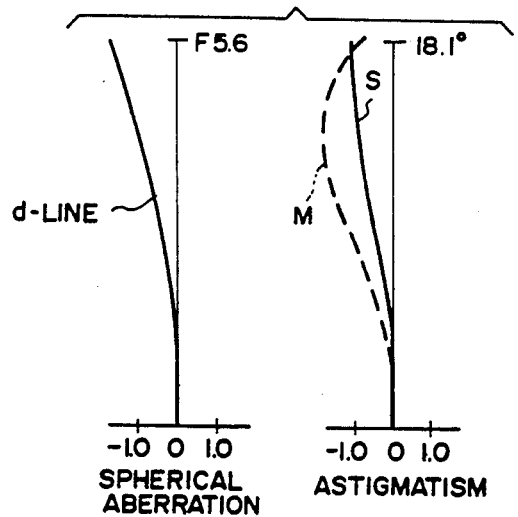
FIG. 8C depicts graphs representing the spherical aberration and astigmatism of the plastic objective lens system as shown in FIG. 7 at 50° C. wherein the coefficients of change in refractive index with temperature (dn/dt) of all the plastic materials constituting the lenses are assumed to be $-8.5 \times 10^{-5}/°C.$

Further, the Embodiment III of the plastic objective lens system in accordance with the present invention is constructed as shown in FIG. 5, and the graphs representing the spherical aberration and astigmatism for the Embodiment III in the same manners as in FIGS. 4A, 4B and 4C are shown in FIGS. 6A, 6B and 6C. Also, the Embodiment IV of the plastic objective lens system in accordance with the present invention is constructed as shown in FIG. 7, and the graphs representing the spherical aberration and astigmatism for the Embodiment IV in the same manners as in FIGS. 4A, 4B and 4C are shown in FIGS. 8A, 8B and 8C.

EMBODIMENT II

The Embodiment II of the plastic objective lens system in accordance with the present invention is constructed in conformity with the following table. The radii of curvature of the surfaces of lenses, the axial air separations or thicknesses of lenses, the refractive indices, the Abbe's dispersion numbers, the coefficients of change in refractive index with temperature ($\times 10^{-5}/°C.$), and the coefficients of linear expansion ($\times 10^{-5} cm/cm/°C.$) are respectively designated at r, d, n, ν, dn/dt, and α, which are numbered, respectively, in the left end column of the table in conformity with FIG. 3.

|   | r | d | n | ν | dn/dt | α | Material |
|---|---|---|---|---|---|---|---|
| 1 | 50.571 | | | | | | |
|   | | 10.587 | 1.49 | 57.2 | −8.5 | 6.5 | Acryl |
| 2 | −90.395 | | | | | | |
|   | | 3.290 | | | | | |
| 3 | −56.718 | | | | | | |
|   | | 2.177 | 1.537 | 45.0 | −13.3 | 6.5 | Cevian MAS 30 (trade name) |
| 4 | 119.025 | | | | | | |
|   | | 0.333 | | | | | |
| 5 | 431.740 | | | | | | |
|   | | 7.036 | 1.49 | 57.2 | −8.5 | 6.5 | Acryl |
| 6 | −530.090 | (reflecting surface) | | | | | |
|   | f = 100 | F 5.6 | | ω = ±24.9° | | | |

EMBODIMENT III

The Embodiment III of the plastic objective lens system in accordance with the present invention is constructed in conformity with the following table. The radii of curvature of the surfaces of lenses, the axial air separations or thicknesses of lenses, the refractive indices, the Abbe's dispersion numbers, the coefficients of change in refractive index with temperature ($\times 10^{-5}/°C.$), and the coefficients of linear expansion ($\times 10^{-5} cm/cm/°C.$) are respectively designated at r, d, n, ν, dn/dt, and α, which are numbered, respectively, in the left end column of the table in conformity with FIG. 5.

|   | r | d | n | ν | dn/dt | α | Material |
|---|---|---|---|---|---|---|---|
| 1 | 40.550 | | | | | | |
|   | | 7.177 | 1.49 | 57.2 | −8.5 | 6.5 | Acryl |
| 2 | −89.974 | | | | | | |
|   | | 3.515 | | | | | |
| 3 | −47.852 | | | | | | |
|   | | 1.762 | 1.537 | 45.0 | −13.3 | 6.5 | Cevian |
| 4 | 117.865 | | | | | | MAS 30 (trade name) |
|   | | 0.276 | | | | | |
| 5 | 1017.432 | | | | | | |
|   | | 3.225 | 1.50137 | 56.5 | 0 | 0 | K5 (Glass) |
| 6 | −644.499 | (reflecting surface) | | | | | |
|   | f = 100 | F 5.6 | | ω = ±24.7° | | | |

EMBODIMENT IV

The Embodiment IV of the plastic objective lens system in accordance with the present invention is constructed in conformity with the following table. The radii of curvature of the surfaces of lenses, the axial air separations or thicknesses of lenses, the refractive indices, the Abbe's dispersion numbers, the coefficients of change in refractive index with temperature ($\times 10^{-5}/°C.$), and the coefficients of linear expansion ($\times 10^{-5} cm/cm/°C.$) are respectively designated at r, d, n, ν, dn/dt, and α, which are numbered, respectively, in the left end column of the table in conformity with FIG. 7.

|   | r | d | n | ν | dn/dt | α | Material |
|---|---|---|---|---|---|---|---|
| 1 | 55.297 | | | | | | |
|   | | 7.191 | 1.49 | 57.2 | −8.5 | 6.5 | Acryl |
| 2 | −204.253 | | | | | | |
|   | | 3.018 | | | | | |
| 3 | −57.517 | | | | | | |
|   | | 7.941 | 1.537 | 45.0 | −13.3 | 6.5 | Cevian MAS 30 (trade name) |
| 4 | −472.791 | (reflecting surface) | | | | | |
|   | f = 100 | F 5.6 | | ω = ±18.1° | | | |

In the Embodiments I to IV, the focal lengths and the conjugate distances for the image formation magnification of 1:1 were calculated at normal temperature (20° C.), and at 50° C. Also, the focal lengths and the conjugate distances for the image formation magnification of 1:1 were calculated at 50° C. when the coefficients of change in refractive index with temperature (dn/dt) of all the plastic materials of the lenses constituting the same lens configurations as in the Embodiments I to IV. The results were as shown in Table 1.

TABLE 1

| Embodiment | Focal length | | | Conjugate distance | | |
|---|---|---|---|---|---|---|
|  | 20° C. | 50° C. | 50° C. (dn1/dt = dn2/dt) | 20° C. | 50° C. | 50° C. (dn1/dt = dn2/dt) |
| I | 100.00 | 99.94 | 100.92 | 401.60 | 401.35 | 405.26 |
| II | 100.00 | 100.11 | 100.65 | 406.40 | 406.84 | 409.00 |
| III | 100.00 | 99.92 | 100.54 | 403.80 | 403.37 | 405.98 |
| IV | 100.00 | 100.22 | 100.57 | 407.10 | 407.99 | 409.40 |

As is clear from Table 1, the degrees of changes in the focal lengths and the conjugate distances with temperature in the Embodiments I to IV in accordance with the present invention are markedly smaller than in a system comprising the lenses constituted of plastic materials exhibiting substantially equal coefficients of change in refractive index with temperature.

Further, in the present invention, no significant fluctuation in aberration arises due to a change in temperature.

I claim:

1. A plastic objective lens system adapted for correction for temperature comprising at least one convex lens constituted of a plastic material exhibiting a relatively small absolute value of the coefficient of change in refractive index with temperature, and at least one concave lens constituted of a plastic material exhibiting an absolute value of the coefficient of change in refractive index with temperature, which is larger than said absolute value of the coefficient of change in refractive index with temperature of the plastic material constituting said convex lens, said plastic objective lens system satisfying the condition (1);

$$1 > \frac{dn1}{dt} / \frac{dn2}{dt} > 0 \quad (1)$$

wherein $dn1/dt$ and $dn2/dt$ respectively denote the coefficients of change in refractive index with temperature of the plastic materials constituting said convex lens and said concave lens.

2. A plastic objective lens system as defined in claim 1 wherein the coefficient of change in refractive index with temperature of the plastic material constituting said convex lens is $-8.5 \times 10^{-5}/°C.$, and the coefficient of change in refractive index with temperature of the plastic material constituting said concave lens is $-13.3 \times 10^{-5}/°C.$ 3. An in-mirror lens type plastic objective lens system adapted for correction for temperature for use in copying, projection or the like at a finite image formation magnification, the objective lens system comprising a reflecting surface concave to the object and image side, at least one convex lens constituted of a plastic material exhibiting a relatively small absolute value of the coefficient of change in refractive index with temperature, and at least one concave lens constituted of a plastic material exhibiting an absolute value of the coefficient of change in refractive index with temperature, which is larger than said absolute value of the coefficient of change in refractive index with temperature of the plastic material constituting said convex lens, said convex lens and said concave lens being positioned on the object and image side in front of said reflecting surface, so that an image formation light beam passes twice midway from the object to said concave reflecting surface and midway from said concave reflecting surface to the image side, said plastic objective lens system satisfying the condition (1);

$$1 > \frac{dn1}{dt} / \frac{dn2}{dt} > 0 \quad (1)$$

wherein $dn1/dt$ and $dn2/dt$ respectively denote the coefficients of change in refractive index with temperature of the plastic materials constituting said convex lens and said concave lens.

4. A plastic objective lens system as defined in claim 3 wherein the coefficient of change in refractive index with temperature of the plastic material constituting said convex lens is $-8.5 \times 10^{-5}/°C.$, and the coefficient of change in refractive index with temperature of the plastic material constituting said concave lens is $-13.3 \times 10^{-5}/°C.$

* * * * *